United States Patent
Mizuta et al.

(10) Patent No.: US 10,734,856 B2
(45) Date of Patent: Aug. 4, 2020

(54) ROTOR FOR ROTARY ELECTRIC MACHINE AND ROTARY ELECTRIC MACHINE

(71) Applicant: MITSUBISHI ELECTRIC CORPORATION, Chiyoda-ku (JP)

(72) Inventors: Takahiro Mizuta, Chiyoda-ku (JP); Moriyuki Hazeyama, Chiyoda-ku (JP); Kazumasa Ito, Chiyoda-ku (JP); Shinichi Yamaguchi, Chiyoda-ku (JP); Masatsugu Nakano, Chiyoda-ku (JP); Yoshiharu Takashima, Chiyoda-ku (JP); Yoshiki Okada, Chiyoda-ku (JP); Masafumi Ogawa, Chiyoda-ku (JP)

(73) Assignee: MITSUBISHI ELECTRIC CORPORATION, Chiyoda-ku (JP)

( * ) Notice: Subject to any disclaimer, the term of this patent is extended or adjusted under 35 U.S.C. 154(b) by 380 days.

(21) Appl. No.: 15/559,869

(22) PCT Filed: Jul. 29, 2016

(86) PCT No.: PCT/JP2016/072361
§ 371 (c)(1),
(2) Date: Sep. 20, 2017

(87) PCT Pub. No.: WO2017/047253
PCT Pub. Date: Mar. 23, 2017

(65) Prior Publication Data
US 2018/0062466 A1    Mar. 1, 2018

(30) Foreign Application Priority Data
Sep. 16, 2015  (JP) .................................. 2015-182834

(51) Int. Cl.
*H02K 1/28*    (2006.01)
*H02K 1/27*    (2006.01)

(52) U.S. Cl.
CPC ............... *H02K 1/28* (2013.01); *H02K 1/274* (2013.01); *H02K 1/278* (2013.01); *H02K 2213/03* (2013.01)

(58) Field of Classification Search
CPC .......... H02K 1/274; H02K 1/278; H02K 1/28; H02K 2213/03; H02K 1/27; H02K 1/2753; H02K 1/30
(Continued)

(56) References Cited

U.S. PATENT DOCUMENTS

| | | | |
|---|---|---|---|
| 6,369,478 B1 * | 4/2002 | Koharagi | ............... H02K 1/276 310/156.23 |
| 2015/0214798 A1 * | 7/2015 | Tajima | ................... H02K 29/03 310/156.19 |

(Continued)

FOREIGN PATENT DOCUMENTS

| | | |
|---|---|---|
| DE | 198 32 253 A1 | 1/2000 |
| DE | 10 2012 211 007 A1 | 1/2014 |

(Continued)

OTHER PUBLICATIONS

Korean Office Action dated Jul. 13, 2018 in Patent Application No. 10-2017-7027936 (with English translation), 15 pages.
(Continued)

*Primary Examiner* — Shawki S Ismail
*Assistant Examiner* — Demetries A Gibson
(74) *Attorney, Agent, or Firm* — Oblon, McClelland, Maier & Neustadt, L.L.P.

(57) ABSTRACT

In a rotary electric machine, a conductive member surrounds a shaft and a plurality of permanent magnets provided on an outer peripheral portion of the shaft as a whole, and a holding member surrounds the shaft, the plurality of permanent magnets, and the conductive member as a whole. A conductivity of the conductive member is higher than a
(Continued)

conductivity of the permanent magnet. The conductive member includes first and second opposing portions that oppose each other via a gap in a circumferential direction. An inter-opposing portion region existing between the first and second opposing portions is positioned within a circumferential direction range of an inter-magnet region existing between permanent magnets that are adjacent to each other in the circumferential direction.

5 Claims, 12 Drawing Sheets

(58) Field of Classification Search
USPC .................. 310/156.08, 156.28–156.31
See application file for complete search history.

(56) References Cited

U.S. PATENT DOCUMENTS

| | | | | |
|---|---|---|---|---|
| 2015/0280523 | A1* | 10/2015 | Tremelling | H02K 1/2786 310/59 |
| 2015/0295459 | A1* | 10/2015 | Hao | B60K 6/48 180/65.26 |
| 2016/0141926 | A1* | 5/2016 | Kano | B60L 50/16 310/156.53 |
| 2017/0366076 | A1* | 12/2017 | Kikuchi | B62D 5/0403 |

FOREIGN PATENT DOCUMENTS

| | | |
|---|---|---|
| JP | 10-243586 A | 9/1998 |
| JP | 2000-60042 A | 2/2000 |
| JP | 2001-78378 A | 3/2001 |
| JP | 2004-147406 A | 5/2004 |
| JP | 2008-219965 A | 9/2008 |
| JP | 2011-125106 A | 6/2011 |

OTHER PUBLICATIONS

International Search Report dated Oct. 18, 2016 in PCT/JP2016/072361, filed on Jul. 29, 2017.

* cited by examiner

ROTOR FOR ROTARY ELECTRIC MACHINE AND ROTARY ELECTRIC MACHINE

TECHNICAL FIELD

This invention relates to a rotor for a rotary electric machine in which permanent magnets are provided on an outer peripheral portion of a rotor core of the rotor, and a rotary electric machine.

BACKGROUND ART

In a conventional rotor for a rotary electric machine, in order to prevent a permanent magnet from peeling away from a rotor core due to centrifugal force generated as the rotor rotates, the permanent magnet is provided on an outer peripheral portion of the rotor core, and the rotor core and permanent magnet are covered as a whole from an outer side of the permanent magnet with a fiber-reinforced plastic holding member (see PTL 1, for example).

Further, when PWM (Pulse Width Modulation) control employing an inverter is executed on a rotary electric machine used for high-speed rotation, harmonic magnetic flux is generated from a carrier frequency component such that eddy currents are generated in the rotor core and the permanent magnet, and as a result, the rotor generates heat. When the rotor generates heat, the temperature of the permanent magnet increases, and as a result, demagnetization occurs in the permanent magnet.

In a conventional rotor for a rotary electric machine proposed in the prior art, heat generation by the rotor is suppressed by disposing a cylindrical high-conductivity member having a higher conductivity than other constituent members, such as a permanent magnet and a shaft, between the permanent magnet and a holding member. In this conventional rotor for a rotary electric machine, eddy currents are generated in the high-conductivity member, and magnetic flux generated by the eddy currents cancels out the harmonic magnetic flux of the carrier frequency component. Hence, eddy current generation in the permanent magnet and the rotor core is suppressed, and as a result, demagnetization of the permanent magnet is suppressed (see PTL 2, for example).

In another rotor for a rotary electric machine proposed in the prior art, manufacture is facilitated by dividing a cylindrical high-conductivity member disposed between a shaft and a permanent magnet into a plurality of conduction portions arranged in a circumferential direction (see PTL 3, for example).

CITATION LIST

Patent Literature

[PTL 1] Japanese Patent Application Publication No. H10-243586
[PTL 2] Japanese Patent Application Publication No. 2001-78378
[PTL 3] Japanese Patent Application Publication No. 2011-125106

SUMMARY OF INVENTION

Technical Problem

However, in the conventional rotor for a rotary electric machine disclosed in PTL 2, the cylindrical high-conductivity member must be manufactured with a reduced thickness in order to suppress an increase in the diameter of the rotary electric machine, and therefore manufacture of the high-conductivity member is laborious.

Further, in the conventional rotor for a rotary electric machine disclosed in PTL 3, the high-conductivity member is divided into a plurality of conduction portions, and therefore the harmonic magnetic flux of the carrier frequency component passes through gaps between adjacent conduction portions so as to reach the permanent magnet and the shaft, with the result that the permanent magnet is demagnetized. When adjacent conduction portions are brought into contact with each other to prevent the harmonic magnetic flux of the carrier frequency component from reaching the permanent magnet and the shaft, contact resistance on a boundary between the respective conduction portions increases such that heat is generated on the boundary between the conduction portions, and the heat from the boundary between the conduction portions is transmitted to the permanent magnet, with the result that the permanent magnet is demagnetized.

This invention has been designed to solve the problems described above, and an object thereof is to obtain a rotor for a rotary electric machine and a rotary electric machine that can be manufactured easily while suppressing demagnetization of a permanent magnet.

Solution to Problem

A rotor for a rotary electric machine according to this invention includes: a rotor core; a plurality of permanent magnets provided on an outer peripheral portion of the rotor core and disposed apart from each other in a circumferential direction; a conductive member that surrounds the rotor core and the plurality of permanent magnets as a whole; and a holding member that surrounds the rotor core, the plurality of permanent magnets, and the conductive member as a whole, wherein a conductivity of the conductive member is higher than a conductivity of the permanent magnet, the conductive member includes first and second opposing portions that oppose each other via a gap in the circumferential direction, and an inter-opposing portion region existing between the first and second opposing portions is positioned only within a circumferential direction range of an inter-magnet region existing between permanent magnets that are adjacent to each other in the circumferential direction.

Advantageous Effects of Invention

With the rotor for a rotary electric machine and the rotary electric machine according to this invention, the conductive member can be incorporated into the rotor simply by wrapping the conductive member around the rotor core and the plurality of permanent magnets as a whole, and therefore the rotor can be manufactured easily. Moreover, by linking harmonic magnetic flux generated by a stator to the conductive member, an amount of harmonic magnetic flux reaching the permanent magnets can be reduced, and by ensuring that harmonic magnetic flux passing through the inter-opposing portion region passes through the inter-magnet region, the likelihood of the harmonic magnetic flux being linked to the permanent magnets can be reduced. As a result, demagnetization of the permanent magnets can be suppressed.

DESCRIPTION OF EMBODIMENTS

Preferred embodiments of this invention will be described below with reference to the figures.

First Embodiment

Figure 1:
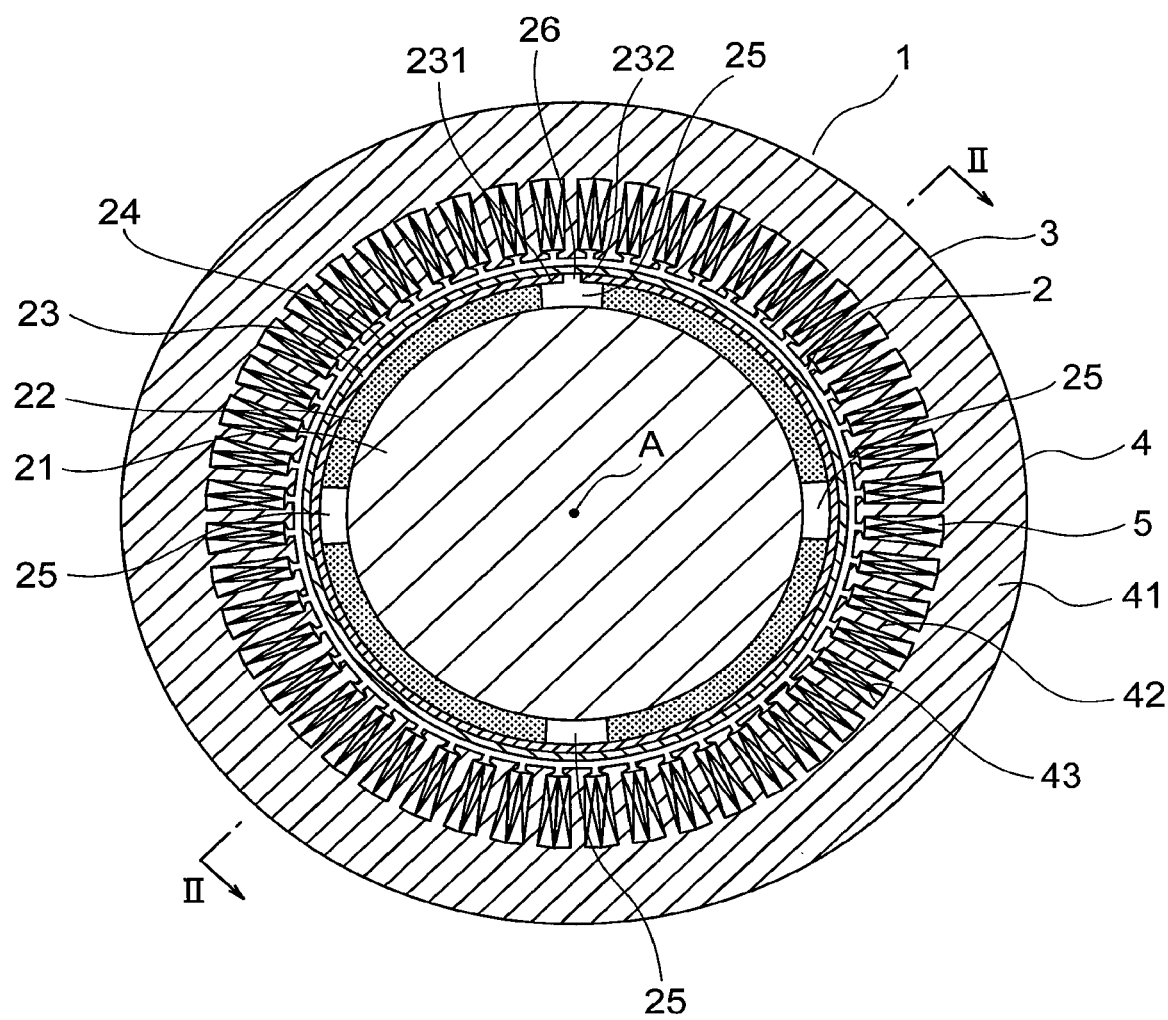
FIG. 1 is a sectional view showing a rotary electric machine according to a first embodiment of this invention.
Figure 2:
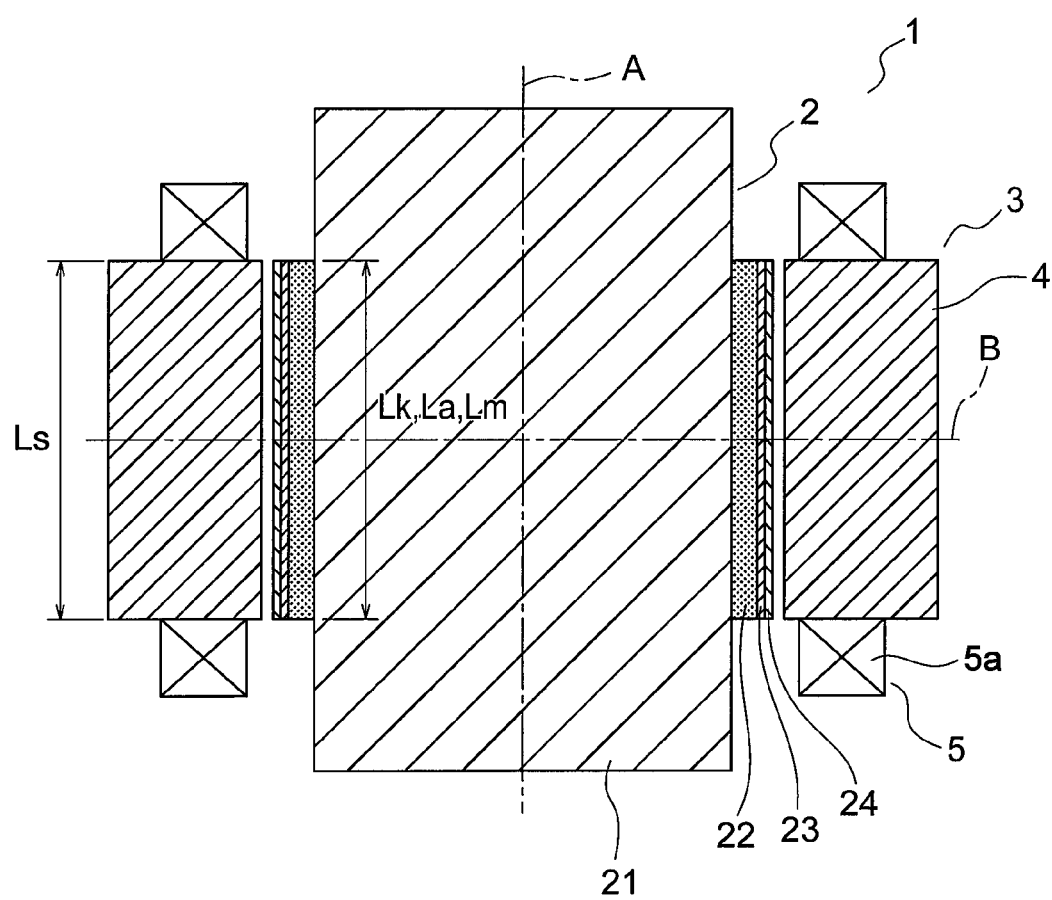
FIG. 2 is a sectional view taken along a II-II line in FIG. 1.

FIG. 1 is a sectional view showing a rotary electric machine according to a first embodiment of this invention, and FIG. 2 is a sectional view taken along a II-II line in FIG. 1. In the figures, a rotary electric machine 1 includes a rotor 2, and a cylindrical stator 3 that surrounds the rotor 2 via a radial direction gap. The rotor 2 and the stator 3 are disposed coaxially. Hence, the rotor 2 and the stator 3 have a common axis A. Further, in this example, as shown in FIG. 2, respective configurations of the rotor 2 and the stator 3 are symmetrical about an orthogonal line B that is orthogonal to the axis A in an axial direction center position of a stator core 4.

The stator 3 includes the cylindrical stator core 4, which is formed from a magnetic material, and stator coils 5 provided on the stator core 4.

The stator core 4 includes a cylindrical back yoke 41, and a plurality of teeth 42 projecting toward a radial direction inner side from an inner peripheral portion of the back yoke 41. The teeth 42 are disposed at intervals in a circumferential direction of the rotary electric machine 1. Slots 43 are formed between the teeth 42 as spaces that open onto the radial direction inner side of the stator 3.

The stator coils 5 are disposed respectively in the slots 43. Further, as shown in FIG. 2, the stator coils 5 have coil ends 5a that project from the stator core 4 in an axial direction, or in other words a direction extending along the axis A. A current is supplied to the stator coils 5 by means of PWM control using an inverter. When power is fed to the stator coils 5, a rotating magnetic field is generated in the stator 3.

The rotor 2 is capable of rotating about the axis A. Further, the rotor 2 includes a shaft 21 serving as a rotor core, a plurality of permanent magnets 22 provided on an outer peripheral portion of the shaft 21, a plate-shaped conductive member 23 that surrounds the shaft 21 and the plurality of permanent magnets 22 as a whole, and a sheet-form holding member 24 that surrounds the shaft 21, the plurality of permanent magnets 22, and the conductive member 23 as a whole.

The shaft 21 is a columnar member having the axis A as a central axis. Further, the shaft 21 is formed from a magnetic material.

The plurality of permanent magnets 22 are disposed at intervals in the circumferential direction of the rotor 2. In this example, four permanent magnets 22 are disposed at equal intervals in the circumferential direction of the rotor 2. The permanent magnets 22 are segment magnets having an arc-shaped cross-section so as to extend around an outer peripheral surface of the shaft 21. An inter-magnet region 25 exists as a space between permanent magnets 22 that are adjacent to each other in the circumferential direction. Rare earth magnets, ferrite magnets, or the like, for example, are used as the permanent magnets 22.

The conductive member 23 covers the permanent magnets 22 and the inter-magnet regions 25 so as to overlap respective outer peripheral surfaces of the permanent magnets 22. In other words, the conductive member 23 is disposed in a position that is closer to the stator 3 than the shaft 21 and the permanent magnets 22. As a result, the conductive member 23 is disposed between the holding member 24 and the respective permanent magnets 22 and inter-magnet regions 25. A conductivity of the conductive member 23 is set to be higher than a conductivity of the permanent magnet 22. Copper, aluminum, or the like, for example, may be used as a material for forming the conductive member 23.

Furthermore, the conductive member 23 includes a first opposing portion 231 and a second opposing portion 232 that oppose each other via a gap in the circumferential direction of the rotor 2. An inter-opposing portion region 26 exists as a space between the first opposing portion 231 and the second opposing portion 232. In this example, the inter-opposing portion region 26 exists in only one location of the conductive member 23 in the circumferential direction of the rotor 2. Further, in this example, the inter-opposing portion region 26 is formed in the conductive member 23 so as to extend along the axis A.

The holding member 24 covers the shaft 21, the plurality of permanent magnets 22, and the conductive member 23 over the entire circumferential direction periphery of the rotor 2 so as to overlap an outer peripheral surface of the conductive member 23. As a result, the rotor 2 is reinforced so that when the rotor 2 rotates at high speed, the permanent magnets 22 do not fly off the shaft 21 due to centrifugal force. The holding member 24 is formed from a non-magnetic material. Carbon fiber reinforced plastic (CFRP), glass fiber reinforced plastic (GFRP), titanium, stainless steel, or the like, for example, is used as the material for forming the holding member 24.

In this example, as shown in FIG. 2, a relationship of Lm=La=Lk=Ls is established, where Lm denotes an axial direction dimension of the permanent magnet 22, La denotes an axial direction dimension of the conductive member 23, Lk denotes an axial direction dimension of the holding member 24, and Ls denotes an axial direction dimension of the stator core 4.

Figure 3:
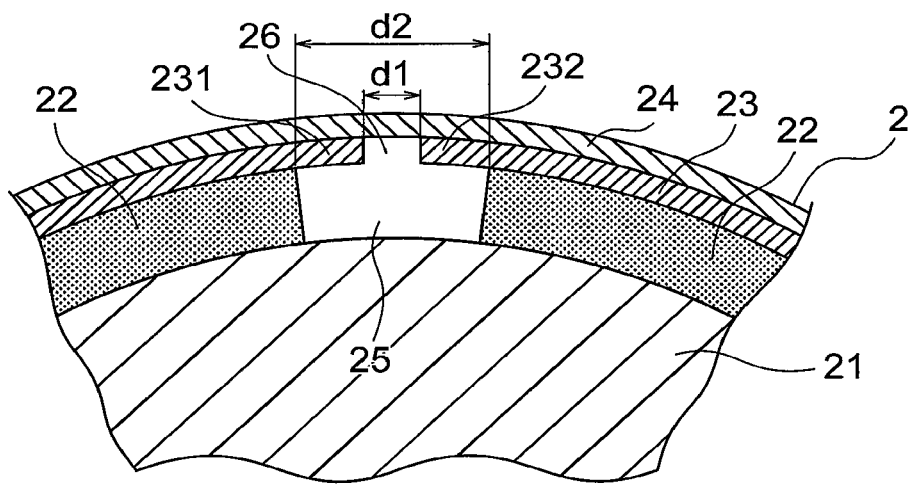
FIG. 3 is an enlarged view showing a part of a rotor shown in FIG. 1 in which an inter-opposing portion region exists.

FIG. 3 is an enlarged view showing a part of the rotor 2 shown in FIG. 1 where the inter-opposing portion region 26 exists. A circumferential direction dimension d1 of the inter-opposing portion region 26 is smaller than a circumferential direction dimension d2 of the inter-magnet region 25. Further, the inter-opposing portion region 26 is positioned only within a circumferential direction range of the inter-magnet region 25. In this example, the inter-opposing portion region 26 is positioned in a circumferential direction center position of the inter-magnet region 25.

Next, procedures for assembling the rotor 2 will be described. After mounting the plurality of permanent magnets 22 on the outer peripheral portion of the shaft 21, the plate-shaped conductive member 23 is wrapped around the shaft 21 and the plurality of permanent magnets 22 as a whole. As a result, the outer periphery of the plurality of permanent magnets 22 is covered by the conductive member 23. At this time, respective end portions of the conductive member 23 are opposed via a circumferential direction gap so as to form the first opposing portion 231 and the second opposing portion 232. As a result, a space that serves as the inter-opposing portion region 26 is formed between the first opposing portion 231 and the second opposing portion 232. Next, the sheet-form holding member 24 is wrapped around the shaft 21, the plurality of permanent magnets 22, and the conductive member 23 as a whole from the radial direction outer side of the conductive member 23. As a result, an outer periphery of the conductive member 23 is covered by the holding member 24, whereby the rotor 2 is complete.

Next, an operation will be described. When a current is supplied to the stator coils 5 from the inverter by means of PWM control, a rotating magnetic field is generated in the stator 3. When the rotating magnetic field is generated in the stator 3, the rotor 2 rotates about the axis A.

The current supplied to the stator coils 5 by means of PWM control includes a carrier harmonic component derived from a carrier frequency. When the current including the carrier harmonic component is supplied to the stator coils 5, harmonic magnetic flux caused by the carrier harmonic component is generated by the stator 3 in addition to fundamental magnetic flux that contributes to torque.

Figure 4:
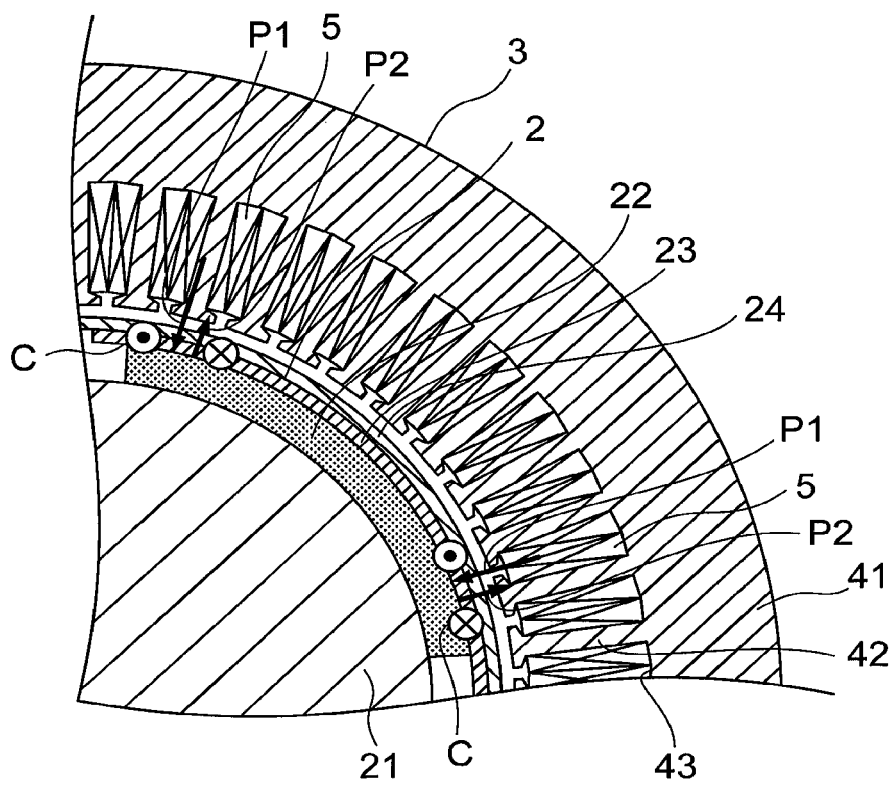
FIG. 4 is an enlarged view showing a part of the rotor shown in FIG. 1 where a conductive member overlaps an outer peripheral surface of a permanent magnet.

FIG. 4 is an enlarged view showing a part of the rotor 2 shown in FIG. 1 where the conductive member 23 overlaps the outer peripheral surface of the permanent magnet 22. When harmonic magnetic flux P1 generated by the stator 3 is linked to the conductive member 23, eddy currents C are generated in the conductive member 23. When the eddy currents C are generated in the conductive member 23, magnetic flux P2 is generated in a direction for canceling out the harmonic magnetic flux P1. As a result, the amount of harmonic magnetic flux P1 linked to the shaft 21 and the permanent magnet 22 is reduced, leading to a reduction in an amount of heat generated by the shaft 21 and the permanent magnet 22. The conductive member 23 generates heat when the eddy currents C are generated therein, but since the conductivity of the conductive member 23 is higher than the conductivity of the permanent magnet 22, the amount of heat generated by the conductive member 23 is smaller than an amount of heat that would be generated by the permanent magnet 22 if harmonic magnetic flux were linked to the permanent magnet 22. Hence, the overall amount of heat generated by the rotor 2 is suppressed. Note that in FIGS. 4 to 6, the eddy currents C that flow from a rear side toward a front side of the paper surface are indicated by a black circle inside a white circle, while the eddy currents C that flows from the front side to the rear side of the paper surface are indicated by a cross inside a white circle.

The rotor 2 according to the first embodiment will now be considered in comparison with respective rotors according to a first comparative example and a second comparative example.

Figure 5:
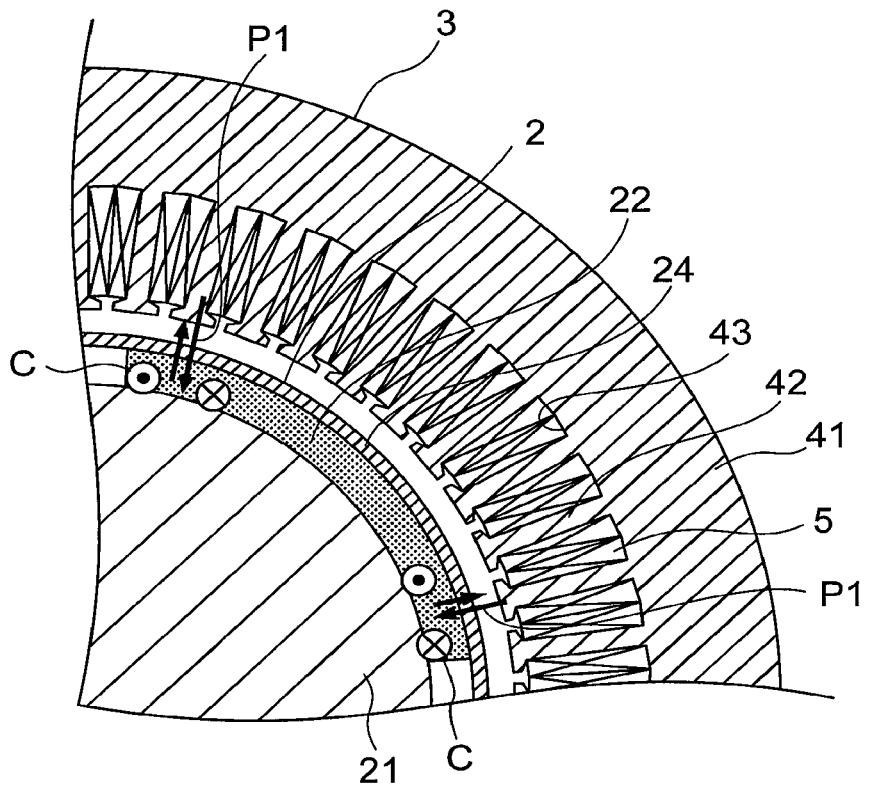
FIG. 5 is a partial enlarged view showing a rotor according to a first comparative example.

FIG. 5 is a partial enlarged view showing the rotor according to the first comparative example. Note that FIG. 5 is a view showing a part of the rotor according to the first comparative example that corresponds to FIG. 4. In the rotor according to the first comparative example, the conductive member 23 is not provided, and therefore the holding member 24 directly overlaps the outer peripheral surface of the permanent magnet 22. All other configurations of the rotor according to the first comparative example are identical to the first embodiment.

In the rotor according to the first comparative example, the conductive member 23 does not exist, and therefore the harmonic magnetic flux P1 generated by the stator 3 is linked to the permanent magnet 22 and the shaft 21 without being reduced by the conductive member 23. Hence, the eddy currents generated in the permanent magnet 22 and the shaft 21 increase, and as a result, the permanent magnet 22 and the shaft 21 are more likely to generate heat.

Figure 6:
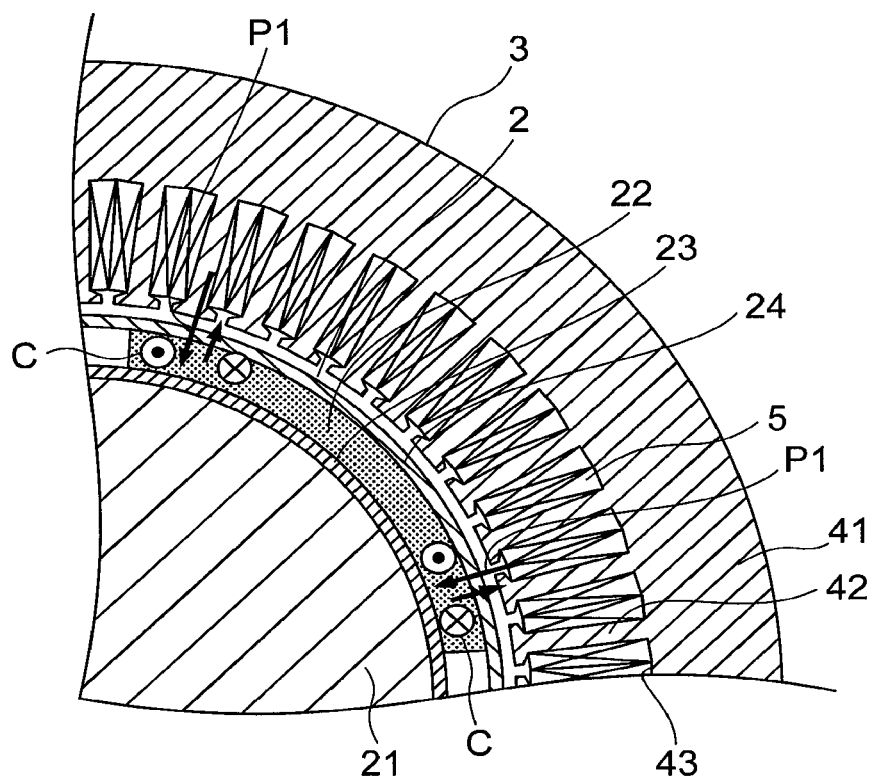
FIG. 6 is a partial enlarged view showing a rotor according to a second comparative example.

FIG. 6 is a partial enlarged view showing the rotor according to the second comparative example. Note that FIG. 6 is a view showing a part of the rotor according to the second comparative example that corresponds to FIG. 4. In the rotor according to the second comparative example, the conductive member 23 is not disposed on the outer periphery of the permanent magnet 22, and instead, the conductive member 23 is disposed between the outer peripheral surface of the shaft 21 and the permanent magnet 22. All other configurations of the rotor according to the second comparative example are identical to the first embodiment.

In the rotor according to the second comparative example, the conductive member 23 is disposed in a position that is further from the stator 3 than the permanent magnet 22, and therefore the harmonic magnetic flux P1 generated by the stator 3 is linked to the permanent magnet 22 without being reduced by the conductive member 23. Hence, the eddy currents generated in the permanent magnet 22 increase, and as a result, the permanent magnet 22 is more likely to generate heat.

It is therefore clear that in the rotors according to both the first and the second comparative examples, the harmonic magnetic flux P1 is linked to the permanent magnet 22 without being reduced by the conductive member 23, and as a result, the permanent magnet 22 is more likely to generate heat than with the rotor 2 according to the first embodiment.

Further, in the rotor 2 according to the first embodiment, the harmonic magnetic flux P1 generated by the stator 3 passes as is through the inter-opposing portion region 26 of the conductive member 23, but since the inter-opposing portion region 26 is positioned within the circumferential direction range of the inter-magnet region 25 where the permanent magnet 22 does not exist, the harmonic magnetic flux P1 is unlikely to be linked to the permanent magnet 22, and therefore heat generation by the permanent magnet 22 is suppressed.

In the rotary electric machine 1 and the rotor 2, as described above, the conductive member 23 having a higher conductivity than the permanent magnet 22 surrounds the shaft 21 and the plurality of permanent magnets 22 as a whole, while the first opposing portion 231 and the second opposing portion 232 of the conductive member 23 are separated from each other in the circumferential direction. Therefore, the conductive member 23 can be incorporated into the rotor 2 simply by wrapping the plate-shaped conductive member 23 around the shaft 21 and the respective permanent magnets 22 as a whole. Hence, the shape of the conductive member 23 can be simplified, and an operation to mount the conductive member 23 on the rotor 2 can be performed easily. As a result, the rotor 2 can be manufactured easily. Furthermore, the harmonic magnetic flux P1 generated by the stator 3 can be linked to the conductive member 23 before reaching the permanent magnets 22, and therefore the harmonic magnetic flux P1 can be reduced. Hence, the permanent magnets 22 are less likely to generate heat, and as a result, demagnetization of the permanent magnets 22 can be suppressed.

Further, the inter-opposing portion region 26 existing between the first opposing portion 231 and the second opposing portion 232 of the conductive member 23 is positioned only within the circumferential direction range of the inter-magnet region 25 existing between adjacent permanent magnets 22, and therefore the likelihood that the harmonic magnetic flux P1 passing through the inter-opposing portion region 26 will be linked to the permanent magnet 22 can be reduced. As a result, demagnetization of the permanent magnets 22 can be further suppressed.

Further, the likelihood that the harmonic magnetic flux P1 will pass through the conductive member 23 can also be reduced by bringing the first opposing portion 231 and the second opposing portion 232 of the conductive member 23 into contact with each other, but in so doing, contact resistance on a boundary between the first opposing portion 231 and the second opposing portion 232 increases. In this case, eddy currents flow through the boundary between the first opposing portion 231 and the second opposing portion 232, leading to large eddy current loss, and as a result, the effect of reducing the harmonic magnetic flux P1 by means of the magnetic flux generated by the eddy currents deteriorates. Moreover, in this case, heat is more likely to be generated on the boundary between the first opposing portion 231 and the second opposing portion 232, and the heat generated on the boundary between the first opposing portion 231 and the second opposing portion 232 is easily transmitted to the permanent magnets 22, leading to an increase in the likelihood that the permanent magnets 22 will be demagnetized. In this embodiment, however, the first opposing portion 231 and the second opposing portion 232 of the conductive member 23 are separated from each other in the circumferential direction, and therefore no contact resistance is generated in the conductive member 23 and no heat is generated due to contact resistance in the conductive member 23. As a result, in this embodiment, demagnetization of the permanent magnets 22 can be even further suppressed.

Further, there is no need to divide the conductive member 23 in the axial direction of the rotor 2, and therefore a reduction in the length of an eddy current path in the axial direction of the rotor 2 can be prevented. Accordingly, a reduction in the eddy currents generated in the conductive member 23 can be prevented, and as a result, a reduction in the effect of reducing the harmonic magnetic flux P1 can be prevented.

Figure 7:
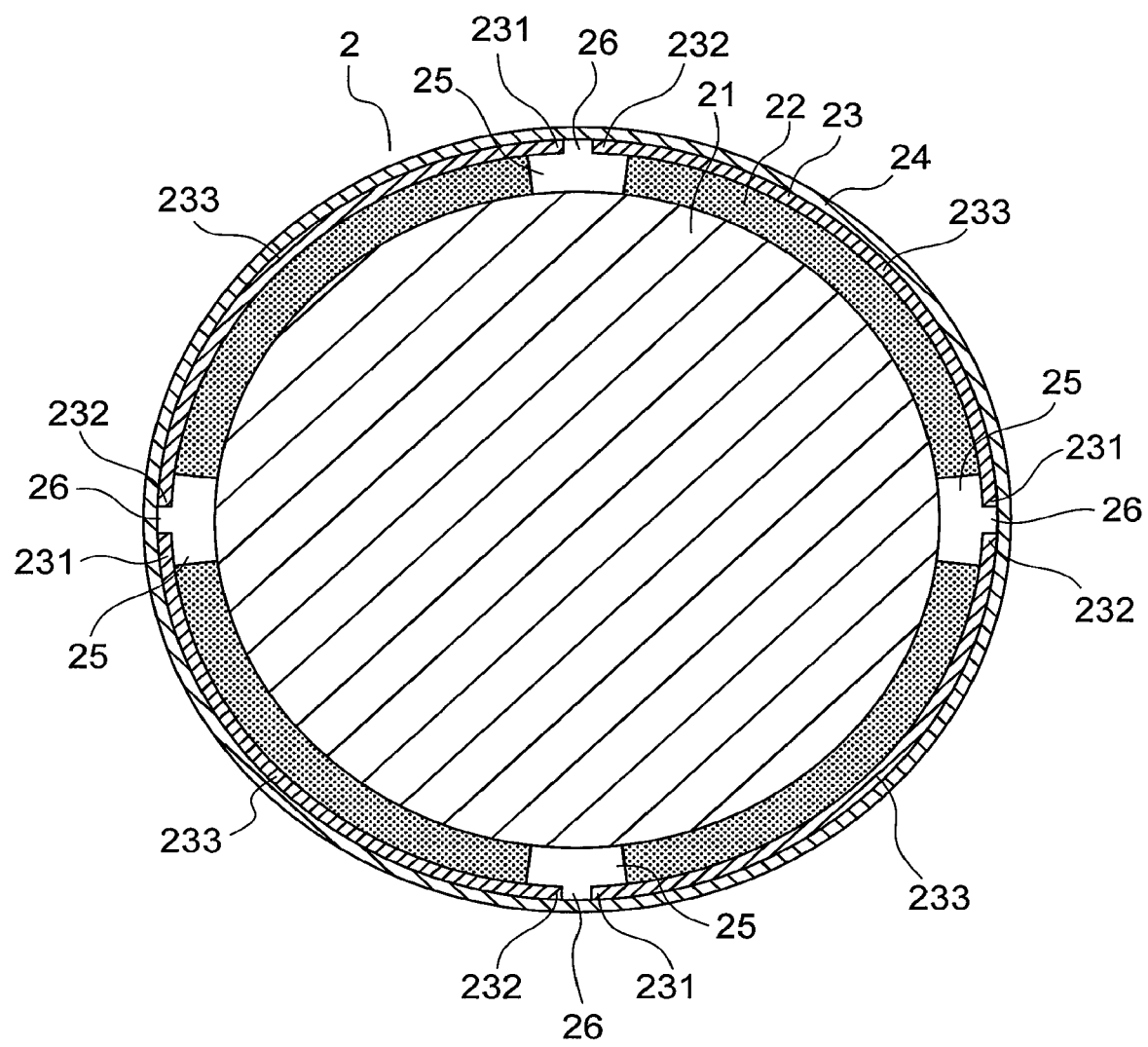
FIG. 7 is a sectional view showing another example of the rotor for a rotary electric machine according to the first embodiment of this invention.

Note that in the example described above, only one inter-opposing portion region 26 is provided in the conductive member 23, but as shown in FIG. 7, the inter-opposing portion region 26 may be provided in the conductive member 23 in a plurality at circumferential direction intervals. In this case, each inter-opposing portion region 26 is positioned only within the circumferential direction range of the inter-magnet region 25. In a case where the inter-opposing portion region 26 is provided in the conductive member 23 in a plurality, the conductive member 23 includes a plurality of conductive pieces, and the plurality of conductive pieces are disposed apart from each other in the circumferential direction via the inter-opposing portion regions 26 such that respective end portions of each conductive piece serve as the first opposing portion 231 and the second opposing portion 232. In the example shown in FIG. 7, four inter-opposing portion regions 26 are provided in the conductive member 23, and the inter-opposing portion regions 26 are positioned individually within the respective circumferential direction ranges of the four inter-magnet regions 25. Further, in the example shown in FIG. 7, four conductive pieces 233 are laminated onto the respective outer peripheral surfaces of the permanent magnets 22 such that the inter-opposing portion regions 26 exist between adjacent conductive pieces 233. In this case, the conductive member 23 can be incorporated into the rotor 2 simply by adhering the conductive pieces 233 respectively onto the outer peripheral surfaces of the permanent magnets 22, and as a result, the rotor 2 can be manufactured even more easily.

Furthermore, in the example described above, the inter-opposing portion region 26 is formed continuously over the entire axial direction region of the conductive member 23, but instead, respective parts of the first opposing portion 231 and the second opposing portion 232 of the conductive member 23 may be coupled to each other via a coupling portion. In this case, the coupling portion has a higher conductivity than the permanent magnet 22. The coupling portion may be formed by directly joining respective parts of the first opposing portion 231 and the second opposing portion 232 to each other by welding, or by inserting a joint piece between the first opposing portion 231 and the second opposing portion 232 and joining the joint piece to the first and second opposing portions 231, 232 by welding.

Figure 8:
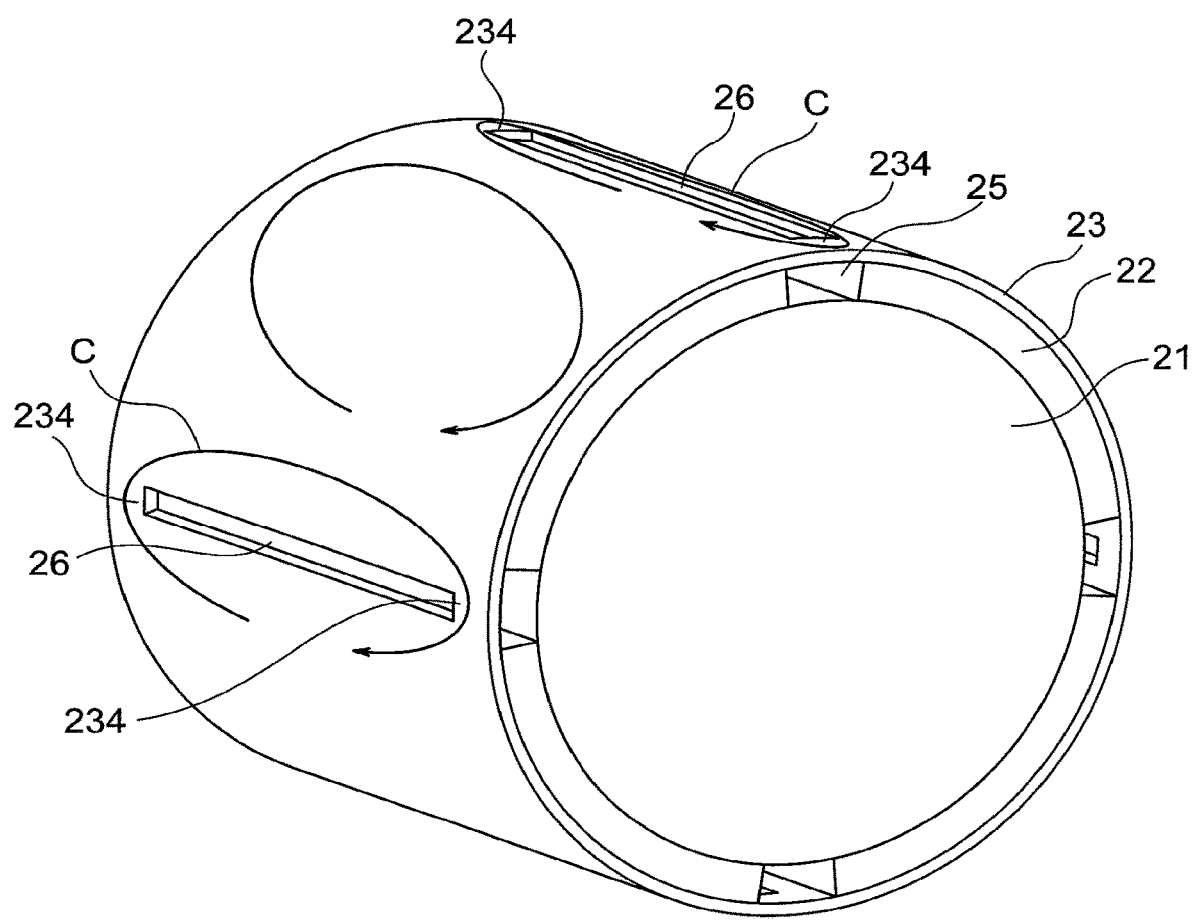
FIG. 8 is a perspective view showing a further example of the rotor for a rotary electric machine according to the first embodiment of this invention, from which a holding member has been omitted.

As shown in FIG. 8, for example, in a case where respective parts of the first opposing portion 231 and the second opposing portion 232 of the conductive member 23 are coupled to each other via the coupling portion, the first opposing portion 231 and the second opposing portion 232 may be coupled to each other via coupling portions 234 only on respective axial direction end portions of the conductive member 23 so that the space serving as the inter-opposing portion region 26 remains as is in an axial direction intermediate portion of the conductive member 23. In so doing, the paths of the eddy currents C that pass through the two coupling portions 234 positioned on the respective axial direction end portions of the conductive member 23 can be increased in length, and as a result, the effect of reducing the harmonic magnetic flux P1 from the stator 3 by means of the magnetic flux generated by the eddy currents C can be enhanced.

Moreover, in the example described above, the axial direction dimension La of the conductive member 23 is set to be identical to the axial direction dimension Lm of the permanent magnet 22, but instead, the axial direction dimension La of the conductive member 23 may be made larger than the axial direction dimension Lm of the permanent magnet 22. In so doing, the paths of the eddy currents C generated in the conductive member 23 can be increased in length, and as a result, the effect of reducing the harmonic magnetic flux P1 can be further enhanced.

Second Embodiment

Figure 9:
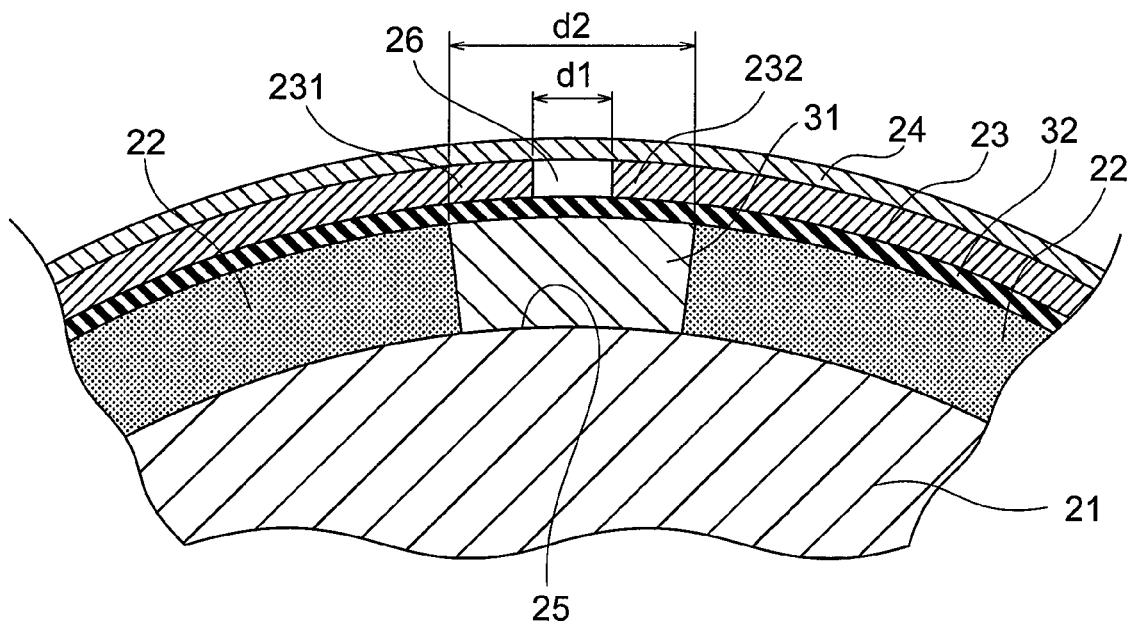
FIG. 9 is an enlarged sectional view showing main parts of a rotor for a rotary electric machine according to a second embodiment of this invention.

FIG. 9 is an enlarged sectional view showing main parts of a rotor for a rotary electric machine according to a second embodiment of this invention. Note that FIG. 9 is a view showing a part of the rotor according to the second embodiment that corresponds to FIG. 3. The rotor 2 further includes a plurality of inter-pole members 31 provided respectively in the inter-magnet regions 25, and an electrical insulation layer 32 interposed between the conductive member 23 and the respective permanent magnets 22 and inter-pole members 31.

Each of the inter-pole members 31 is disposed in the axial direction of the rotor 2. Further, each inter-pole member 31 is fitted without gaps between respective side faces of two adjacent permanent magnets 22. The inter-opposing portion region 26 is positioned within a circumferential direction range of the inter-pole member 31. Furthermore, no step is formed on a boundary between an outer peripheral surface of the inter-pole member 31 and the outer peripheral surface of the permanent magnet 22. In other words, the outer peripheral surface of the inter-pole member 31 is connected smoothly to the outer peripheral surface of the permanent magnet 22.

The conductivity of the inter-pole member 31 is higher than the conductivity of the permanent magnet 22. The inter-pole members 31 may be formed from an identical material or a different material to the conductive member 23.

When a specific gravity difference between the inter-pole member 31 and the permanent magnet 22 is large, shear stress generated by the centrifugal force of the rotor 2 is exerted on the conductive member 23 on a boundary part between the inter-pole member 31 and the permanent magnet 22, and therefore the specific gravity difference between the inter-pole member 31 and the permanent magnet 22 is preferably as small as possible. Even more preferably, the specific gravity of the inter-pole member 31 is equal to the specific gravity of the permanent magnet 22. In this example, an iron-based alloy such as stainless steel, for example, having a small specific gravity difference to the permanent magnet 22 is used as the material of the inter-pole member 31.

The electrical insulation layer 32 surrounds the shaft 21, the permanent magnets 22, and the inter-pole members 31 as a whole so as to overlap the respective outer peripheral surfaces of the permanent magnets 22 and the inter-pole members 31. The conductive member 23 overlaps an outer peripheral surface of the electrical insulation layer 32. As a result, the conductive member 23 is electrically insulated from the permanent magnets 22 and the inter-pole members 31 by the electrical insulation layer 32.

In this embodiment, when the harmonic magnetic flux P1 is generated by the stator 3, the harmonic magnetic flux P1 that passes through the inter-opposing portion region 26 is linked to the inter-pole member 31. When the harmonic magnetic flux P1 is linked to the inter-pole member 31, eddy currents are generated in the inter-pole member 31, and when the eddy currents are generated, magnetic flux is generated in a direction for canceling out the harmonic magnetic flux P1. As a result, the harmonic magnetic flux P1 that passes through the inter-opposing portion region 26 is reduced before reaching the shaft 21 and the permanent magnets 22. All other configurations and operations are identical to the first embodiment.

In the rotary electric machine 1 and the rotor 2, as described above, the inter-pole member 31 is provided in the inter-magnet region 25, and the conductivity of the inter-pole member 31 is set to be higher than the conductivity of the permanent magnet 22. Therefore, even when the harmonic magnetic flux P1 generated by the stator 3 passes through the inter-opposing portion region 26, the harmonic magnetic flux P1 passing through the inter-opposing portion region 26 can be linked to the inter-pole member 31 such that eddy currents are generated in the inter-pole member 31, and as a result, magnetic flux is generated in a direction for canceling out the harmonic magnetic flux P1. Hence, the harmonic magnetic flux P1 can be reduced by the inter-pole member 31 as well as the conductive member 23, and as a result, demagnetization of the permanent magnets 22 can be even further suppressed.

Furthermore, the electrical insulation layer 32 is interposed between the conductive member 23 and the respective permanent magnets 22 and inter-pole members 31, and therefore the conductive member 23 can be electrically insulated from the inter-pole members 31, thereby preventing eddy currents from flowing between the conductive member 23 and the inter-pole members 31. Accordingly, eddy current loss and heat generation in the rotor 2 can be suppressed, and as a result, demagnetization of the permanent magnets 22 can be even further suppressed.

More specifically, when the conductive member 23 contacts the inter-pole member 31, contact resistance increases on the boundary between the conductive member 23 and the inter-pole member 31. In this case, when eddy currents flow through the boundary between the conductive member 23 and the inter-pole member 31, large eddy current loss occurs, and as a result, the effect of reducing the harmonic magnetic flux P1 by means of the magnetic flux generated by the eddy currents deteriorates. Furthermore, in this case, heat is more likely to be generated on the boundary between the conductive member 23 and the inter-pole member 31, and the heat generated on the boundary between the conductive member 23 and the inter-pole member 31 is easily transmitted to the permanent magnet 22, leading to an increase in the likelihood that the permanent magnet 22 will be demagnetized. In this embodiment, however, the electrical insulation layer 32 prevents eddy currents from flowing between the conductive member 23 and the inter-pole member 31, and therefore eddy current loss and heat generation in the rotor 2 can be suppressed. As a result, demagnetization of the permanent magnets 22 can be even further suppressed.

Note that in the example described above, an adhesive layer for adhering the conductive member 23 fixedly to the respective outer peripheral surfaces of the permanent magnets 22 and the inter-pole members 31 may be used as the electrical insulation layer 32. An adhesive exhibiting a superior electrical insulation performance, such as an epoxy resin-based adhesive or a silicone resin-based adhesive, for example, is preferably used as the adhesive forming the adhesive layer, but there are no particular limitations thereon.

Further, in the example described above, the electrical insulation layer 32 is preferably disposed over the entire range of the conductive member 23 in the axial direction of the rotor 2. More specifically, an axial direction dimension Li of the electrical insulation layer 32 is preferably equal to the axial direction dimension La of the conductive member 23, or in other words, it is preferable that Li=La.

Furthermore, in the example described above, shear stress acting on the holding member 24 increases steadily as the circumferential direction dimension d1 of the inter-opposing portion region 26 increases. The circumferential direction dimension d1 of the inter-opposing portion region 26 is therefore preferably as small as possible. Hence, to specify a set range of the circumferential direction dimension d1 of the inter-opposing portion region 26, a relationship between a stress concentration factor of the stress generated in the holding member 24 and the circumferential direction dimension d1 of the inter-opposing portion region 26 was calculated by analysis. The stress concentration factor is a value obtained by dividing a maximum stress generated in a member by an average stress, and is used as an index when evaluating fatigue strength.

In the analysis, carbon fiber reinforced plastic was used as the material of the holding member 24, copper was used as the material of the conductive member 23, and stainless steel was used as the material of the inter-pole member 31. Further, in the analysis, a rotation speed of the rotor 2 was set at 30000 rpm, and an outer diameter of the rotor 2 was set at approximately 100 mm.

Figure 10:
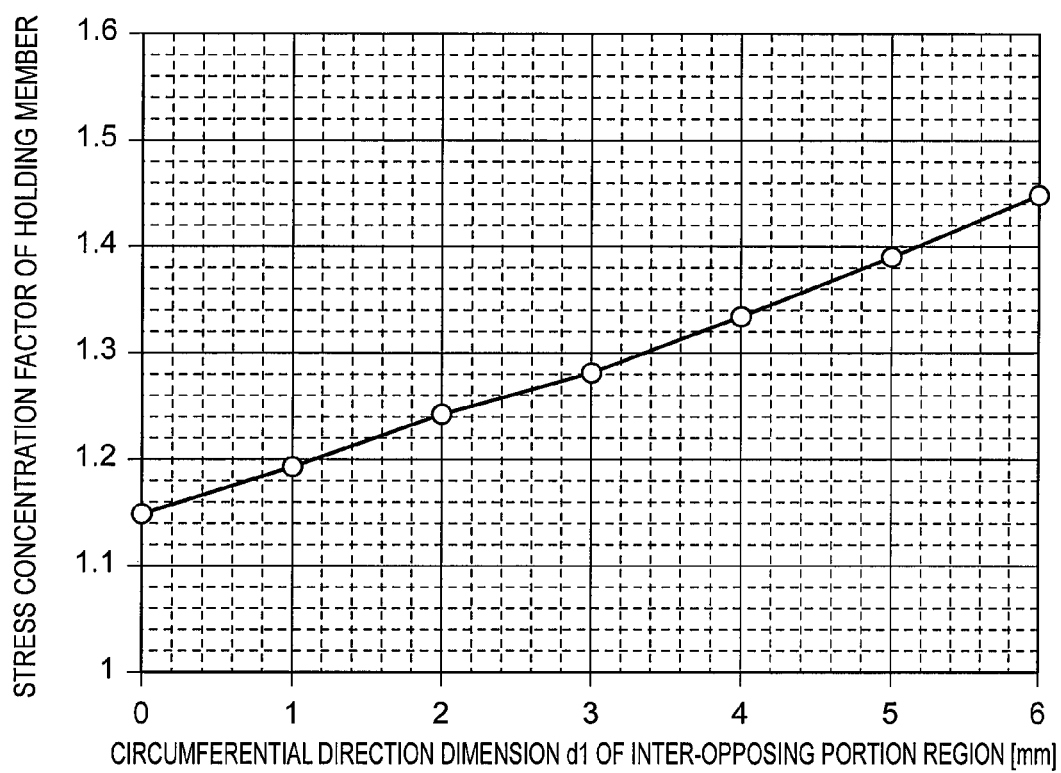
FIG. 10 is a graph showing a relationship between a stress concentration factor of stress generated in a holding member shown in FIG. 9, and a circumferential direction dimension of an inter-opposing portion region.

FIG. 10 is a graph showing the relationship between the stress concentration factor of the stress generated in the holding member 24 shown in FIG. 9, and the circumferential direction dimension d1 of the inter-opposing portion region 26. To secure sufficient fatigue strength in the holding member 24, the stress concentration factor is preferably no greater than 1.4. On the graph shown in FIG. 10, the stress concentration factor of the holding member 24 remains at or below 1.4 when the circumferential direction dimension d1 of the inter-opposing portion region 26 is no greater than 5 mm. In the example described above, therefore, the circumferential direction dimension d1 of the inter-opposing portion region 26 is preferably no greater than 5 mm.

Moreover, in the example described above, respective holding member 24 side corner portions of the first opposing portion 231 and the second opposing portion 232 of the conductive member 23 may be chamfered. In so doing, the shear stress exerted on the holding member 24 from the conductive member 23 can be reduced, and as a result, the holding member 24 can be prevented from breaking.

Third Embodiment

Figure 11:
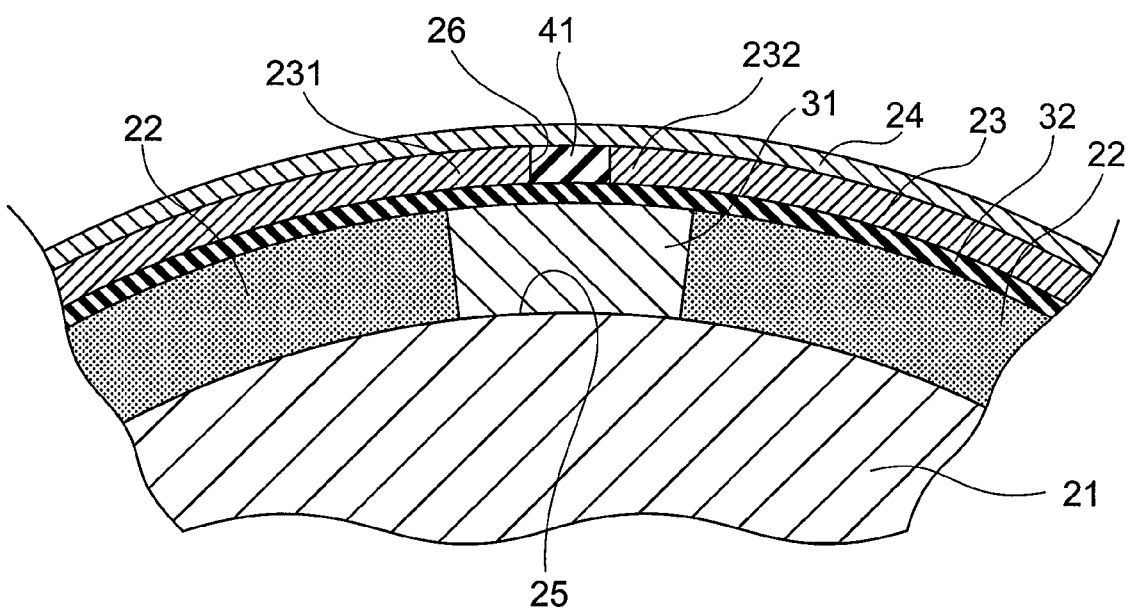
FIG. 11 is an enlarged sectional view showing main parts of a rotor for a rotary electric machine according to a third embodiment of this invention.

FIG. 11 is an enlarged sectional view showing main parts of a rotor for a rotary electric machine according to a third embodiment of this invention. Note that FIG. 11 is a view showing a part of the rotor according to the third embodiment that corresponds to FIG. 3. The rotor 2 further includes a filling member 45 provided in the inter-opposing portion region 26.

The filling member 45 is an electrical insulator. Further, the filling member 45 is disposed in the inter-opposing portion region 26 without gaps. In this example, a resin molded body is filled into the inter-opposing portion region 26 as the filling member 45. No step is formed on a boundary between an outer peripheral surface of the filling member 45 and the outer peripheral surface of the conductive member 23. In other words, the outer peripheral surface of the filling member 45 is connected smoothly to the outer peripheral surface of the conductive member 23. All other configurations and operations are identical to the second embodiment.

In the rotary electric machine 1 and the rotor 2, as described above, the filling member 45 is provided in the inter-opposing portion region 26, and therefore the holding member 24 can be supported by the filling member 45 in the inter-opposing portion region 26. Hence, shear stress acting on the holding member 24 in the positions of the first opposing portion 231 and the second opposing portion 232 of the conductive member 23 can be reduced, and as a result, the holding member 24 can be prevented from breaking. Further, the filling member 45 is an electrical insulator, and therefore eddy currents can be prevented from flowing between the first opposing portion 231 and the second opposing portion 232 more reliably. Accordingly, eddy current loss in the conductive member 23 can be reduced, and as a result, demagnetization of the permanent magnets 22 can be even more reliably suppressed.

Note that there are no particular limitations on the material of the filling member 45, but when a specific gravity difference between the filling member 45 and the conductive member 23 is large, the shear stress acting on the holding member 24 may increase due to a difference in the centrifugal force generated as the rotor 2 rotates. Therefore, the specific gravity difference between the filling member 45 and the conductive member 23 is preferably as small as possible, and even more preferably, the specific gravity of the filling member 45 is equal to the specific gravity of the conductive member 23.

Furthermore, in the example described above, the configuration of disposing the filling member 45 in the inter-opposing portion region 26 is applied to the rotor 2 according to the second embodiment, but the configuration of disposing the filling member 45 in the inter-opposing portion region 26 may be applied to the rotor 2 according to the first embodiment.

Fourth Embodiment

Figure 12:
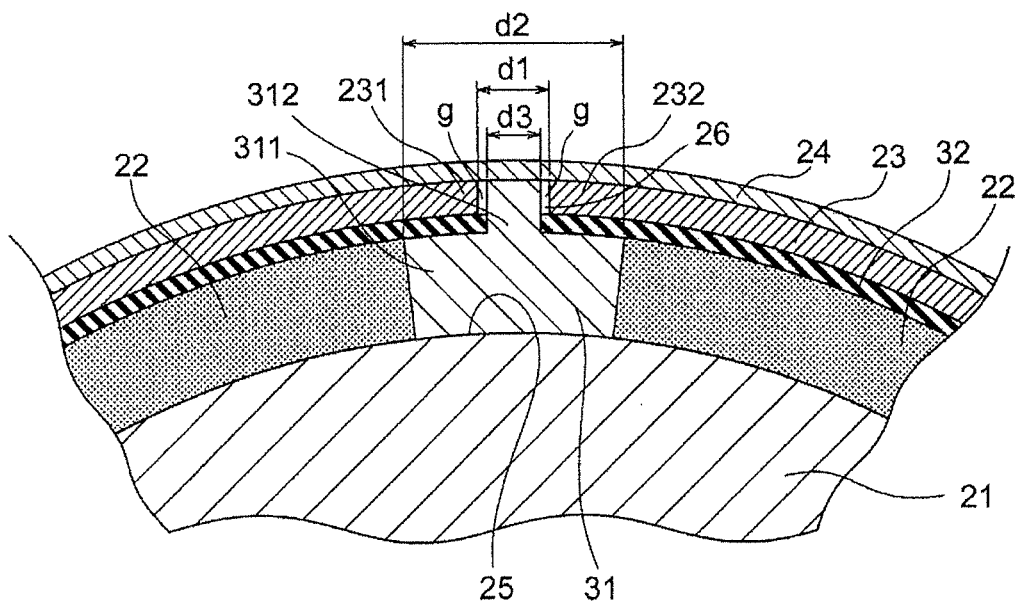
FIG. 12 is an enlarged sectional view showing main parts of a rotor for a rotary electric machine according to a fourth embodiment of this invention.

FIG. 12 is an enlarged sectional view showing main parts of a rotor for a rotary electric machine according to a fourth embodiment of this invention. Note that FIG. 12 is a view showing a part of the rotor according to the fourth embodiment that corresponds to FIG. 3. The inter-pole member 31 provided in the inter-magnet region 25 that corresponds to the circumferential direction position of the inter-opposing portion region 26, among the respective inter-magnet regions 25, includes an inter-pole member main body 311, and a projecting portion 312 that projects radially outward from the inter-pole member main body 311 and penetrates the electrical insulation layer 32 so as to reach the interior of the inter-opposing portion region 26.

The inter-pole member main body 311 is fitted without gaps between the respective side faces of two adjacent permanent magnets 22. No step is formed on a boundary between an outer peripheral surface of the inter-pole member main body 311 and the outer peripheral surface of the permanent magnet 22. In other words, the outer peripheral surface of the inter-pole member main body 311 is connected smoothly to the outer peripheral surface of the permanent magnet 22.

A projection dimension by which the projecting portion 312 projects from the inter-pole member main body 311 is equal to a sum of a thickness dimension of the electrical insulation layer 32 and a thickness dimension of the conductive member 23. Further, a projecting end face of the projecting portion 312 contacts an inner peripheral surface of the holding member 24. Hence, the projecting end face of the projecting portion 312 contacts the inner peripheral surface of the holding member 24 on a hypothetical circle that overlaps the outer peripheral surface of the conductive member 23 contacting the holding member 24. Moreover, a circumferential direction dimension of the projecting portion 312, or in other words a width dimension d3 of the projecting portion 312, is smaller than the circumferential direction dimension d1 of the inter-opposing portion region 26. As a result, the projecting portion 312 is removed from both the first opposing portion 231 and the second opposing portion 232 of the conductive member 23. In other words, small gaps g are formed respectively in the circumferential direction between the projecting portion 312 and the first opposing portion 231 and second opposing portion 232. All other configurations and operations are identical to the second embodiment.

In the rotary electric machine 1 and the rotor 2, as described above, the projecting portion 312 that projects from the inter-pole member main body 311 provided in the inter-magnet region 25 penetrates the electrical insulation layer 32 so as to reach the inter-opposing portion region 26 and contact the holding member 24, and therefore the holding member 24 can be supported by the projecting portion 312 between the first opposing portion 231 and the second opposing portion 232 of the conductive member 23, enabling a reduction in the shear stress that acts on the holding member 24 respectively from the first opposing portion 231 and the second opposing portion 232. As a result, the holding member 24 can be prevented from breaking. Moreover, by disposing the projecting portion 312 in the inter-opposing portion region 26, the proportion of the harmonic magnetic flux P1 generated by the stator 3 that passes through the inter-opposing portion region 26 can be even further reduced, and as a result, demagnetization of the permanent magnets 22 can be even further suppressed.

In addition, the projecting portion 312 is removed from both the first opposing portion 231 and the second opposing portion 232 of the conductive member 23, and therefore eddy currents can be more reliably prevented from flowing between the conductive member 23 and the projecting portion 312. As a result, eddy current loss in both the conductive member 23 and the inter-pole member 31 can be reduced.

Note that in the example described above, the shear stress acting on the holding member 24 from the first and second opposing portions 231, 232 decreases steadily as a circumferential direction dimension of each of the gaps g formed between the conductive member 23 and the projecting portion 312 decreases, but when the gap g is too small, the conductive member 23 and the projecting portion 312 are more likely to come into contact with each other. Hence, to ensure that the conductive member 23 and the projecting portion 312 do not contact each other, the dimension of the gap g is preferably set to be larger than a dimension obtained by adding together a circumferential direction machining error of the projecting portion 312 and a circumferential direction machining error of the conductive member 23.

Further, in the example described above, the inter-pole member 31 having the inter-pole member main body 311 and the projecting portion 312 is disposed in the inter-magnet region 25 of the rotor 2 according to the second embodiment, but the inter-pole member 31 having the inter-pole member main body 311 and the projecting portion 312 may be disposed in the inter-magnet region 25 of the rotor 2 according to the first embodiment, which does not include the electrical insulation layer 32. In this case, the inter-pole member main body 311 is disposed in the inter-magnet region 25 such that the projecting portion 312 projecting from the inter-pole member main body 311 toward the inter-opposing portion region 26 contacts an inner peripheral surface of the holding member 24. Furthermore, in this case, the inter-pole member 31 is formed from an electrical insulator. Likewise in this case, the shear stress acting on the holding member 24 from the first opposing portion 231 and the second opposing portion 232 can be reduced, and as a result, the holding member 24 can be prevented from breaking.

Fifth Embodiment

Figure 13:
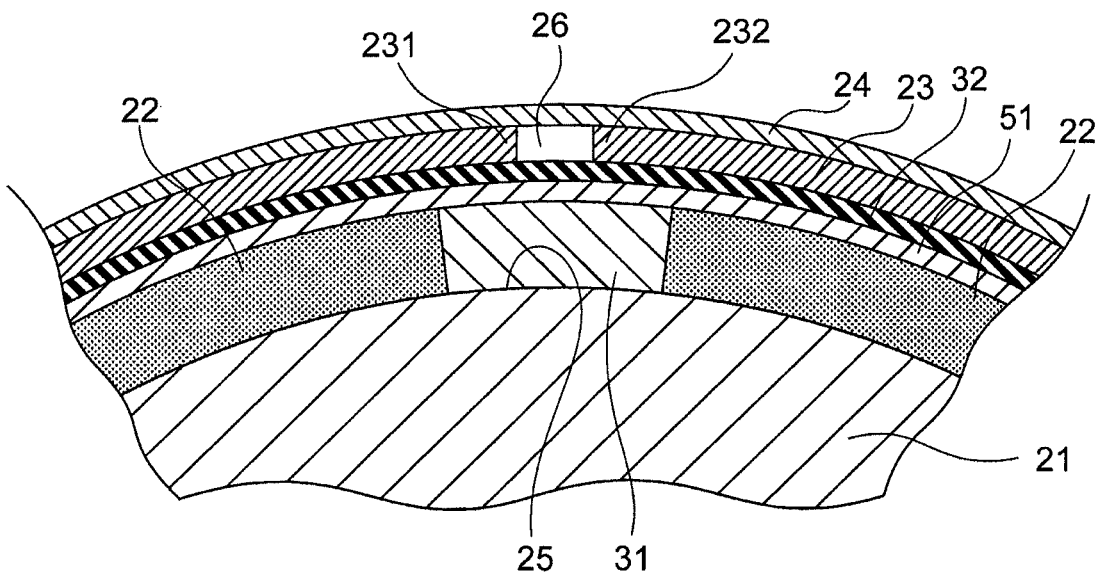
FIG. 13 is an enlarged sectional view showing main parts of a rotor for a rotary electric machine according to a fifth embodiment of this invention.

FIG. 13 is an enlarged sectional view showing main parts of a rotor for a rotary electric machine according to a fifth embodiment of this invention. Note that FIG. 13 is a view showing a part of the rotor according to the fifth embodiment that corresponds to FIG. 3. The rotor 2 further includes a conductive film 51 interposed between the electrical insulation layer 32 and the respective permanent magnets 22 and inter-pole members 31.

The conductive film 51 surrounds the shaft 21, the permanent magnets 22, and the inter-pole members 31 as a whole. Further, the conductive film 51 overlaps the respective outer peripheral surfaces of the permanent magnets 22 and the inter-pole members 31 over the entire circumferential direction periphery of the rotor 2. The conductive film 51 has a higher conductivity than the permanent magnets 22. An aluminum alloy, a copper alloy, or the like, for example, is used as a material for forming the conductive film 51.

The electrical insulation layer 32 is interposed between the conductive film 51 and the conductive member 23. As a result, the conductive member 23 is electrically insulated from the conductive film 51 by the electrical insulation layer 32. The conductivity of the inter-pole members 31 is not particularly limited, and may be set at any value.

In this embodiment, when the harmonic magnetic flux P1 is generated by the stator 3, the harmonic magnetic flux P1 that passes through the inter-opposing portion region 26 is linked to the conductive film 51. When the harmonic magnetic flux P1 is linked to the conductive film 51, eddy currents are generated in the conductive film 51, and when the eddy currents are generated, magnetic flux is generated in a direction for canceling out the harmonic magnetic flux P1. As a result, the harmonic magnetic flux P1 that passes through the inter-opposing portion region 26 is reduced before reaching the shaft 21 and the permanent magnets 22. All other configurations and operations are identical to the second embodiment.

In the rotary electric machine 1 and the rotor 2, as described above, the conductive film 51 having higher conductivity than the permanent magnets 22 is interposed between the electrical insulation layer 32 and the respective permanent magnets 22 and inter-pole members 31. Therefore, even when the harmonic magnetic flux P1 generated by the stator 3 passes through the inter-opposing portion region 26, the harmonic magnetic flux P1 that passes through the inter-opposing portion region 26 can be linked to the conductive film 51 such that magnetic flux is generated in a direction for canceling out the harmonic magnetic flux P1 in response to the eddy currents generated in the conductive film 51. Hence, the harmonic magnetic flux P1 can be reduced by the conductive film 51 as well as the conductive member 23, and as a result, demagnetization of the permanent magnets 22 can be even further suppressed.

Furthermore, the electrical insulation layer 32 is interposed between the conductive film 51 and the conductive member 23, and therefore the conductive member 23 can be electrically insulated from the conductive film 51, thereby preventing eddy currents from flowing between the conductive member 23 and the conductive film 51. Accordingly, eddy current loss and heat generation in the rotor 2 can be suppressed, and as a result, demagnetization of the permanent magnets 22 can be even further suppressed.

Note that in the example described above, when a thickness dimension of the conductive film 51 is excessively large, an increased magnetic gap is formed, and as a result, loss in the stator 3 increases. When the thickness dimension of the conductive film 51 is excessively small, on the other hand, resistance generated by the conductive film 51 increases, making it more difficult for eddy currents to flow through the conductive film 51, and as a result, the effect of canceling out the harmonic magnetic flux P1 deteriorates. When an aluminum alloy is used as the material of the conductive film 51, a sufficient effect for canceling out the harmonic magnetic flux P1 can be obtained without greatly affecting the magnetic gap by setting the thickness dimension of the conductive film 51 within a range of 0.2 mm to 0.5 mm.

Further, in the example described above, a space serves as the inter-opposing portion region 26, but similarly to the third embodiment, the filling member 45 may be disposed in the inter-opposing portion region 26.

Sixth Embodiment

Figure 14:
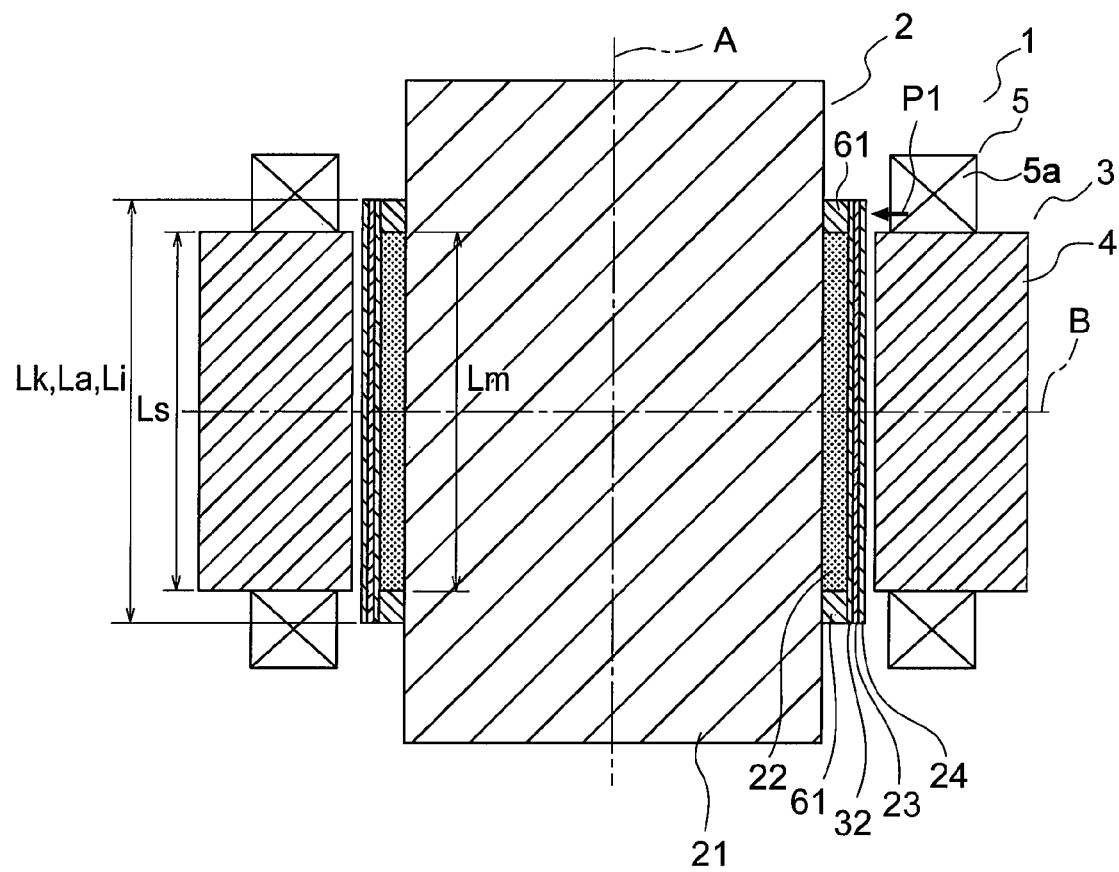
FIG. 14 is a sectional view showing a rotary electric machine according to a sixth embodiment of this invention.

FIG. 14 is a sectional view showing a rotary electric machine according to a sixth embodiment of this invention. The rotor 2 further includes a pair of ring members 61 provided on respective axial direction outer sides of the permanent magnets 22. The permanent magnets 22 are sandwiched between the pair of ring members 61 in the axial direction of the rotor 2. One ring member 61 contacts one end face of each of the permanent magnets 22, and the other ring member 61 contacts another end face of each of the permanent magnets 22.

The pair of ring members 61 are fitted onto the outer peripheral surface of the shaft 21. Further, respective radial direction thicknesses of the pair of ring members 61 are identical to a thickness dimension of the permanent magnet 22. The conductivity of each of the ring members 61 is not particularly limited, and may be set at any value.

The electrical insulation layer 32, the conductive member 23, and the holding member 24 respectively extend to positions covering the pair of ring members 61 in the axial direction of the rotor 2. Accordingly, in the axial direction position of each ring member 61, an outer peripheral surface of the ring member 61 is covered by the electrical insulation layer 32, the outer peripheral surface of the electrical insulation layer 32 is covered by the conductive member 23, and the outer peripheral surface of the conductive member 23 is covered by the holding member 24. In other words, in the axial direction position of each ring member 61, the ring member 61 is disposed between the shaft 21 and the electrical insulation layer 32 in the radial direction of the rotor 2, while the conductive member 23 and the holding member 24 are laminated onto the outer peripheral surface of the electrical insulation layer 32 in succession toward the radial direction outer side. Furthermore, in this example, as shown in FIG. 14, the respective configurations of the rotor 2 and the stator 3 are symmetrical about the orthogonal line B that is orthogonal to the axis A in the axial direction center position of the stator core 4.

Moreover, relationships of Lk≥La=Li>Lm and La>Ls are established between the axial direction dimension Li of the electrical insulation layer 32, the axial direction dimension Lm of the permanent magnet 22, the axial direction dimension La of the conductive member 23, the axial direction dimension Lk of the holding member 24, and the axial direction dimension Ls of the stator core 4.

When a current is supplied to the stator coils 5 by means of PWM control, the harmonic magnetic flux P1 derived from the carrier frequency is generated by the stator 3. At this time, a current is also supplied to the coil ends 5a positioned on the respective axial direction end portions of the stator 3, and therefore the harmonic magnetic flux P1 is also generated outside the axial direction range of the stator core 4.

Here, the conductive member 23 does not exist outside the axial direction range of the stator core 4, and therefore, when the axial direction dimension Ls of the stator core 4 is equal to the axial direction dimension La of the conductive member 23, or in other words when Ls=La, the harmonic magnetic flux P1 generated outside the axial direction range of the stator core 4 is linked to the shaft 21 without being reduced by the conductive member 23. Hence, when Ls=La, large eddy current loss occurs in the shaft 21 outside an axial direction range of the stator core 4.

In this embodiment, however, the conductive member 23 also exists outside the axial direction range of the stator core 4, and therefore the harmonic magnetic flux P1 that is generated outside the axial direction range of the stator core 4 is linked to the conductive member 23 such that eddy currents are generated in the conductive member 23. Accordingly, magnetic flux is generated in a direction for canceling out the harmonic magnetic flux P1, and as a result, the eddy current loss generated in the shaft 21 is reduced. All other configurations and operations are identical to the second embodiment.

In this rotary electric machine 1, the ring members 61 provided on the axial direction outer sides of the permanent magnets 22 are interposed between the shaft 21 and the electrical insulation layer 32, while the axial direction dimension Li of the electrical insulation layer 32, the axial direction dimension Lm of the permanent magnet 22, the axial direction dimension La of the conductive member 23, the axial direction dimension Lk of the holding member 24, and the axial direction dimension Ls of the stator core 4 are set to satisfy relationships of Lk≥La=Li>Lm and La>Ls, and therefore the harmonic magnetic flux P1 that is generated outside the axial direction range of the stator core 4 can be linked to the conductive member 23. Hence, the harmonic magnetic flux P1 can be reduced before reaching the shaft 21 even outside the axial direction range of the stator core 4, and therefore eddy current loss in the shaft 21 can be reduced. Accordingly, heat generation by the rotor 2 can be further suppressed, and as a result, demagnetization of the permanent magnets 22 can be even further suppressed.

Moreover, when a space is formed between the shaft 21 and the electrical insulation layer 32, shear stress generated in the electrical insulation layer 32 and the conductive member 23 increases in positions where the axial direction end portions of the permanent magnets 22 contact the electrical insulation layer 32 due to the centrifugal force generated as the rotor 2 rotates. In this embodiment, however, the ring members 61 are interposed between the outer peripheral surface of the shaft 21 and the electrical insulation layer 32 outside the axial direction range of the stator core 4, and therefore the shear stress generated in the electrical insulation layer 32 and the conductive member 23 can be reduced.

Note that in the example described above, the shear stress generated in the electrical insulation layer 32 and the conductive member 23 decreases steadily as a specific gravity difference between the ring member 61 and the permanent magnet 22 decreases. The specific gravity difference between the ring member 61 and the permanent magnet 22 is therefore preferably as small as possible, and even more preferably, the specific gravity of the ring member 61 is equal to the specific gravity of the permanent magnet 22.

Furthermore, the ring member may be formed by laminating a plurality of ring-shaped thin plates.

Moreover, in the example described above, the configuration of providing the pair of ring members 61 on the axial direction outer sides of the permanent magnets 22 is applied to the rotor 2 according to the second embodiment, but the configuration of providing the pair of ring members 61 on the axial direction outer sides of the permanent magnets 22 may be applied to the rotors 2 according to the third to fifth embodiments.

Seventh Embodiment

Figure 15:
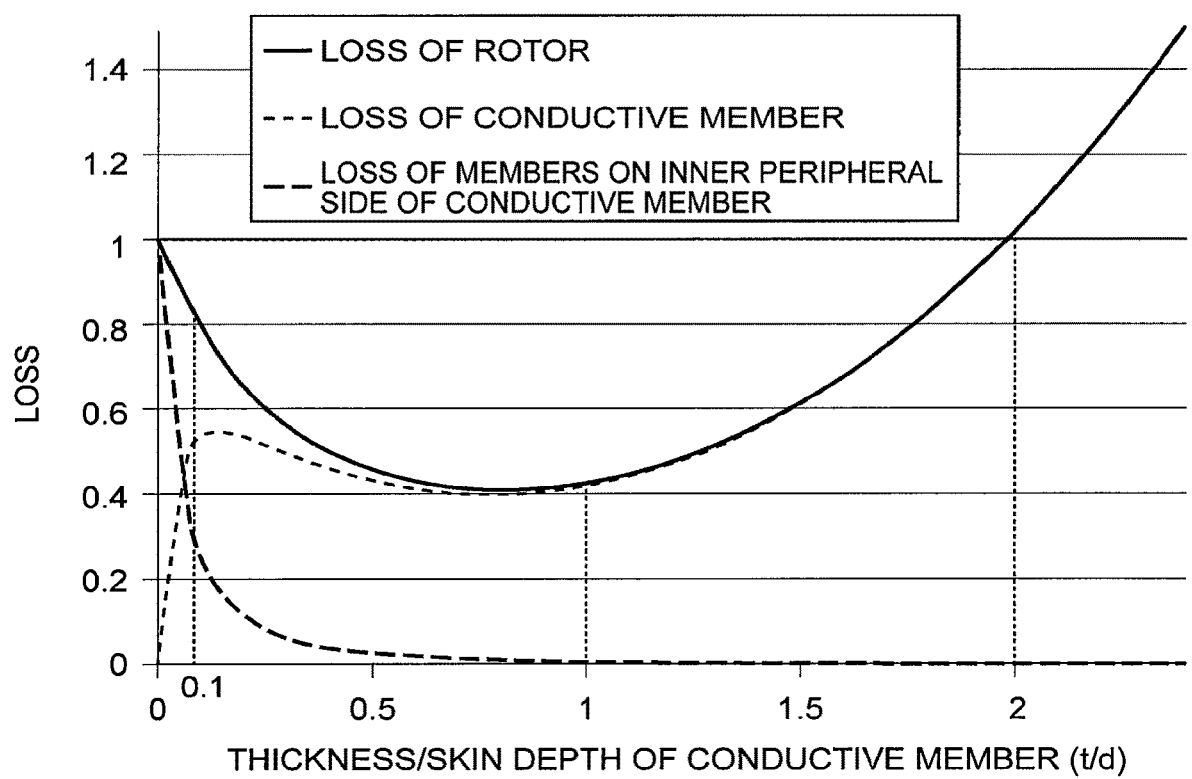
FIG. 15 is a graph representing a relationship between a radial direction thickness of a conductive member according to a seventh embodiment of this invention, and loss occurring in the rotor when an inverter is driven.

FIG. 15 is a graph representing a relationship between a radial direction thickness of the conductive member 23 according to a seventh embodiment of this invention, and loss occurring in the rotor 2 when the inverter is driven. The rotor 2 according to this embodiment is configured identically to the rotor 2 according to the first embodiment except that a set range of a radial direction thickness t of the conductive member 23 is specified. When a resistivity of the conductive member 23 is set as $\rho$, a permeability of the conductive member 23 is set as $\mu$, and a carrier angular frequency of the inverter used to drive the rotary electric machine is set as $\omega_c$, a skin depth d of the conductive member 23 when eddy currents generated in response to carrier harmonic magnetic flux flow through the conductive member 23 is defined as shown below in Formula (1).

[Math. 1]

$$d = \sqrt{\frac{2\rho}{\omega_c \mu}} \tag{1}$$

FIG. 15 shows respective degrees of dependence on the radial direction thickness t of the conductive member 23 of loss caused by eddy currents generated in the conductive member 23, loss caused by eddy currents generated in the permanent magnets 22 and the shaft 21, i.e. the members on the inner peripheral side of the conductive member 23, and the loss of the rotor 2, i.e. the sum of the aforesaid losses. Here, a distance from a front surface of the teeth 42 of the stator 3 to the outer peripheral surface of the permanent magnets 22 is assumed to be constant. Further, in FIG. 15, the abscissa shows normalized values (t/d) obtained by normalizing the radial direction thickness t of the conductive member 23 by the skin depth d, and the ordinate shows normalized values obtained by setting the loss of the rotor 2 in a case where the conductive member 23 does not exist (t=0) at 1.

As shown in FIG. 15, the loss in the members on the inner peripheral side of the conductive member 23 decreases steadily as the radial direction thickness of the conductive member 23 increases. The reason for this is that as the radial direction thickness of the conductive member 23 increases, a sectional area of the conductive member 23 increases, leading to a reduction in the resistance thereof. Accordingly, the eddy currents flowing through the conductive member 23 become larger, and as a result, the carrier harmonic magnetic flux is canceled out such that the magnetic flux that is linked to the members on the inner peripheral side of the conductive member 23 decreases.

As is evident from FIG. 15, when t/d is 0.1, the loss in the members on the inner peripheral side of the conductive member 23 is no greater than half the loss that occurs when the conductive member 23 is omitted, and when t/d reaches 1, the loss in the members on the inner peripheral side of the conductive member 23 decreases to no greater than 1% of the loss that occurs when the conductive member 23 is omitted. As the radial direction thickness t of the conductive member 23 increases, however, the eddy currents flowing through the conductive member 23 increase, leading to a corresponding increase in the loss of the conductive member 23. However, when the radial direction thickness t of the conductive member 23 increases, the resistance value of the conductive member 23 decreases, and therefore the loss of the conductive member 23 switching to a decreasing direction at approximately the point where t/d exceeds 0.15. As the radial direction thickness t of the conductive member 23 increases further, the distance from the surface of the conductive member 23 to the teeth 42 of the stator 3 decreases, leading to an increase in magnetic flux density variation caused by pulsation of the magnetic resistance, and as a result, the loss of the conductive member 23 gradually increases. When t/d reaches 2, the loss of the rotor 2 becomes identical to the loss that occurs when the conductive member does not exist (t=0), and when t/d exceeds 2, the loss of the rotor 2 exceeds the loss that occurs when the conductive member does not exist (t=0). Hence, the loss of the rotor 2, i.e. the sum of the loss of the conductive member 23 and the loss of the members on the inner peripheral side of the conductive member 23, reaches a minimum at t/d≤1. In other words, the loss of the rotor 2 reaches a minimum when the radial direction thickness t of the conductive member 23 is within a range of t/d≤1.

The thickness t of the conductive member 23 according to this embodiment is set to satisfy Formula (2), shown below.

[Math. 2]

$$0 < \frac{t}{d} \leq 2 \tag{2}$$

In this embodiment, the thickness t of the conductive member 23 is set to satisfy Formula (2), and therefore the loss of the rotor 2 can be reduced in comparison with a case where the conductive member 23 does not exist. As a result, demagnetization of the permanent magnets 22 can be suppressed.

Note that in this example, the radial direction thickness t of the conductive member 23 is set to satisfy Formula (2), but the set range of the radial direction thickness t of the conductive member 23 may be further limited by setting the radial direction thickness t of the conductive member 23 to satisfy Formula (3), shown below.

[Math. 3]

$$0.1 \leq \frac{t}{d} \leq 1 \tag{3}$$

By setting the radial direction thickness t of the conductive member 23 to satisfy Formula (3), an upper limit of t/d can be set at 1, and therefore the loss of the rotor 2 can be reduced even further in comparison with a case where the radial direction thickness t of the conductive member 23 is set at t/d≤2, with the result that demagnetization of the permanent magnets 22 can be suppressed. Moreover, by setting the thickness t of the conductive member 23 to satisfy Formula (3), a lower limit of t/d can be set at 0.1, and therefore the loss of the members on the inner peripheral side of the conductive member 23 can be reduced to no greater than half the loss that occurs when the conductive member 23 does not exist. Hence, eddy current loss in the permanent magnets 22 can be reduced, and as a result, demagnetization of the permanent magnets 22 can be suppressed.

Figure 16:
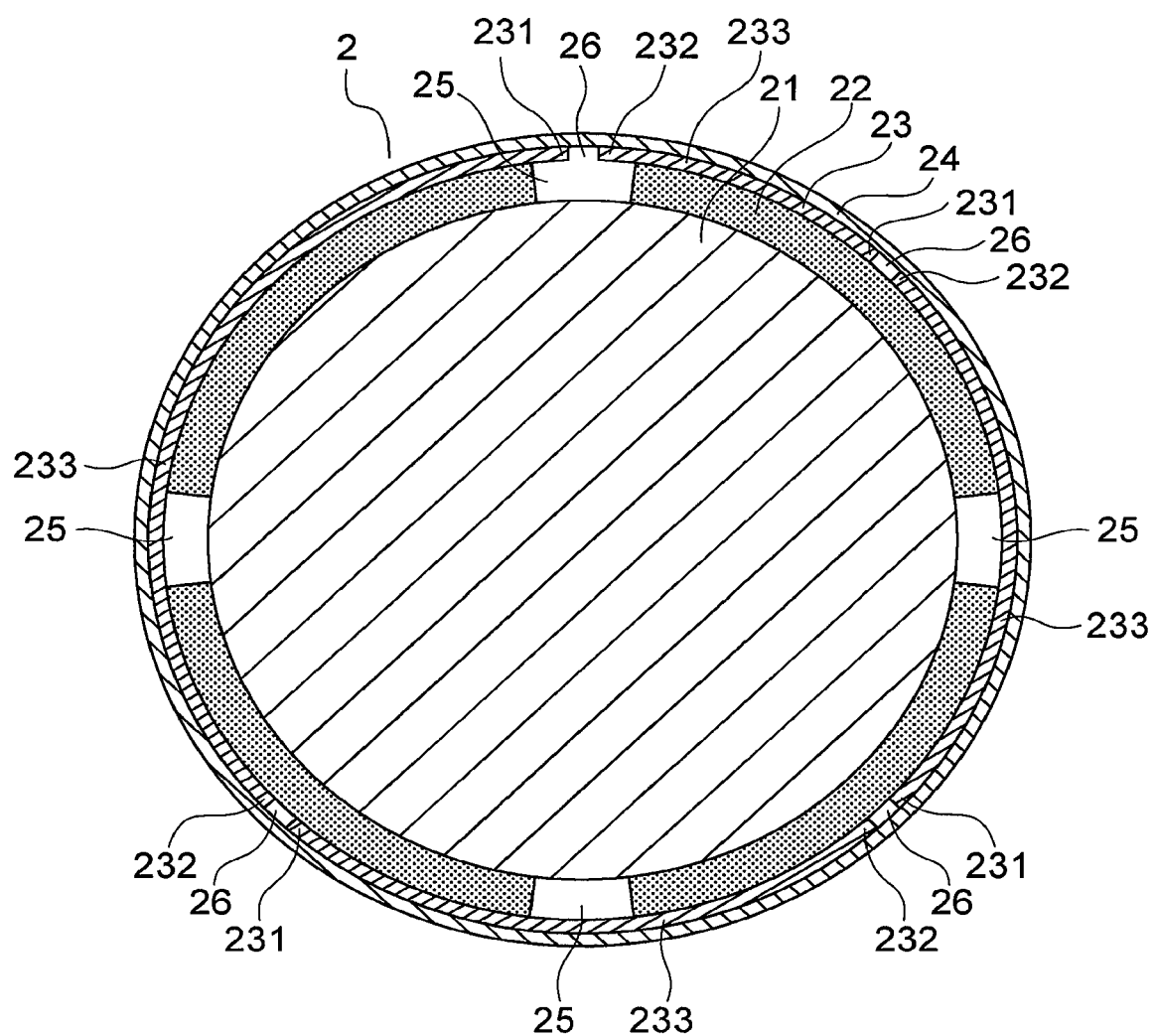
FIG. 16 is a view showing a further example of the rotor for a rotary electric machine according to the first embodiment of this invention.

Note that in the first embodiment, each inter-opposing portion region 26 is positioned only within the circumferential direction range of the inter-magnet region 25, but as shown in FIG. 16, at least one of a plurality of the inter-opposing portion regions 26 may be positioned within the circumferential direction range of the inter-magnet region 25. In the rotor 2 shown in FIG. 16, one of four inter-opposing portion regions 26 is positioned within the circumferential direction range of the inter-magnet region 25, while the three remaining inter-opposing portion regions 26 are positioned on the permanent magnets 22 rather than in the inter-magnet regions 25. By employing this configuration, the carrier harmonic magnetic component that is linked to the permanent magnets 22 can be canceled out by the conductive member 23, in contrast to a case where all of the inter-opposing portion regions 26 are provided on the permanent magnets 22, and as a result, demagnetization of the permanent magnets 22 can be suppressed. Moreover, the configuration of positioning at least one of a plurality of inter-opposing portion regions 26 within the circumferential direction range of the inter-magnet region 25 may be applied respectively to the second to sixth embodiments.

Furthermore, in the embodiments described above, the respective configurations of the rotor 2 and the stator 3 are symmetrical about the orthogonal line B, but the respective configurations of the rotor 2 and the stator 3 may be asymmetrical about the orthogonal line B.

This invention is not limited to the embodiments described above, and may be subjected to various modifications on the basis of the fundamental technical scope and the teachings of the invention.

REFERENCE SIGNS LIST

1 Rotary electric machine
2 Rotor
3 Stator
4 Stator core
5 Stator coil
21 Shaft (rotor core)
22 Permanent magnet
23 Conductive member
24 Holding member
25 Inter-magnet region
26 Inter-opposing portion region
31 Inter-pole member
32 Electrical insulation layer
41 Filling member
51 Conductive film
61 Ring member
231 First opposing portion
232 Second opposing portion
311 Inter-pole member main body
312 Projecting portion

The invention claimed is:

1. A rotor for a rotary electric machine, comprising:
a rotor core;
a plurality of permanent magnets provided on an outer peripheral portion of the rotor core and disposed apart from each other in a circumferential direction;
a conductive member that surrounds the rotor core and the plurality of permanent magnets as a whole; and
a holding member that surrounds the rotor core, the plurality of permanent magnets, and the conductive member as a whole,
wherein a conductivity of the conductive member is higher than a conductivity of the permanent magnet,
the conductive member includes first and second opposing portions that oppose each other via a gap in the circumferential direction,
an inter-opposing portion region existing between the first and second opposing portions is positioned within a circumferential direction range of an inter-magnet region existing between permanent magnets that are adjacent to each other in the circumferential direction, and
when a radial direction thickness of the conductive member is set as t, a resistivity of the conductive member is set as $\rho$, a permeability of the conductive member is set as $\mu$, a carrier angular frequency of an inverter used to drive the rotary electric machine is set as $\omega_c$, and a skin depth of the conductive member is set as d, d is defined as $$d = \sqrt{\frac{2\rho}{\omega_c \mu}},$$

and
a relationship satisfying $$0 < \frac{t}{d} \le 2$$

is established between t and d.

2. The rotor for a rotary electric machine according to claim 1, wherein a relationship satisfying $$0.1 \le \frac{t}{d} \le 1$$

is further established between t and d.

3. The rotor for a rotary electric machine according to claim 1, further comprising an inter-pole member provided in the inter-magnet region,
wherein the inter-pole member includes: an inter-pole member main body provided in the inter-magnet region; and a projecting portion that projects from the inter-pole member main body toward the inter-opposing portion region, and contacts the holding member.

4. The rotor for a rotary electric machine according to claim 2, further comprising an inter-pole member provided in the inter-magnet region,
wherein the inter-pole member includes: an inter-pole member main body provided in the inter-magnet region; and a projecting portion that projects from the inter-pole member main body toward the inter-opposing portion region, and contacts the holding member.

5. A rotary electric machine comprising:
the rotor according to claim 1; and
a stator that surrounds the rotor via a radial direction gap.

* * * * *